US010689538B2

(12) United States Patent
Ciampini (10) Patent No.: US 10,689,538 B2
(45) Date of Patent: Jun. 23, 2020

(54) MULTICOMPONENT REACTIVE INKS AND PRINTING METHOD (71) Applicant: SICPA HOLDING SA, Prilly (CH)

(72) Inventor: Davide Ciampini, Pavone Canavese (IT)

(73) Assignee: SICPA HOLDING SA, Prilly (CH)

(*) Notice: Subject to any disclaimer, the term of this patent is extended or adjusted under 35 U.S.C. 154(b) by 0 days.

(21) Appl. No.: 16/314,575

(22) PCT Filed: Jul. 25, 2017

(86) PCT No.: PCT/EP2017/068750
§ 371 (c)(1),
(2) Date: Dec. 31, 2018

(87) PCT Pub. No.: WO2018/019824
PCT Pub. Date: Feb. 1, 2018

(65) Prior Publication Data
US 2019/0322888 A1 Oct. 24, 2019

(30) Foreign Application Priority Data
Jul. 25, 2016 (EP) ..................... 16180981

(51) Int. Cl.
C09D 11/54 (2014.01)
B41M 3/14 (2006.01)
(Continued)

(52) U.S. Cl.
CPC ............ C09D 11/54 (2013.01); B41M 3/14 (2013.01); B41M 5/0023 (2013.01);
(Continued)

(58) Field of Classification Search
CPC . B41M 5/0023; B41M 5/0017; C09D 11/033; C09D 11/102; C09D 11/328;
(Continued)

(56) References Cited

U.S. PATENT DOCUMENTS 6,245,711 B1 6/2001 Halbrook, Jr.
6,306,929 B1 10/2001 Amon et al.
(Continued)

FOREIGN PATENT DOCUMENTS

JP 2010121060 6/2010
WO 2007045579 4/2007
WO 2012084052 6/2012

OTHER PUBLICATIONS

International Search Report and Written Opinion issued with respect to application No. PCT/EP2017/068750.
(Continued)

Primary Examiner — John Zimmermann
(74) Attorney, Agent, or Firm — Muncy, Geissler, Olds & Lowe, P.C.

(57) ABSTRACT

A printing system for printing a security feature in the form of a latent image comprising at least three compositions (RI), (C1) and (C2):
(RI) a reactive ink comprising a silane compound (A) comprising at least a first and a second polymerizable moiety which are different from each other and are polymerizable by different mechanisms, loaded in a first reservoir of a first printhead,
(C1) a first catalyst composition comprising a substance able to react with the silane compound (A) of composition (RI) and promote the polymerization of the first polymerizable moiety, loaded in a second reservoir of said first printhead or of a second printhead,
(C2) a second catalyst composition comprising a substance able to react, alone or in presence of composition (C1), with the silane compound (A) of composition (RI) and promote the polymerization of the second polymerizable moiety.

21 Claims, 5 Drawing Sheets (51) Int. Cl.
   *B41M 5/00*     (2006.01)
   *C09D 11/033*   (2014.01)
   *C09D 11/037*   (2014.01)
   *C09D 11/102*   (2014.01)
   *C09D 11/328*   (2014.01)
   *C09D 11/38*    (2014.01)

(52) U.S. Cl.
   CPC .......... *C09D 11/033* (2013.01); *C09D 11/037* (2013.01); *C09D 11/102* (2013.01); *C09D 11/328* (2013.01); *C09D 11/38* (2013.01)

(58) Field of Classification Search
   CPC ....... C09D 11/54; C09D 11/101; C09D 11/38; B42D 25/378; C08L 71/02; C08K 3/011; C08K 5/0025
   See application file for complete search history.

(56) References Cited

U.S. PATENT DOCUMENTS

| | | | |
|---|---|---|---|
| 6,848,781 B2 * | 2/2005 | Ogino | B41M 5/0011 347/100 |
| 7,608,388 B2 | 10/2009 | Deutsch et al. | |
| 7,632,423 B2 | 12/2009 | Halahmi et al. | |
| 7,699,918 B2 | 4/2010 | Odell et al. | |
| 7,845,572 B2 | 12/2010 | Wicker et al. | |
| 8,342,669 B2 | 1/2013 | Faucher et al. | |
| 8,807,697 B2 | 8/2014 | Coggan et al. | |
| 2004/0254303 A1 * | 12/2004 | Chang | C08K 3/06 525/329.1 |
| 2005/0014005 A1 | 1/2005 | Kramer et al. | |
| 2006/0160917 A1 | 7/2006 | Oyanagi et al. | |
| 2008/0051517 A1 * | 2/2008 | Okai | C08L 33/08 525/227 |
| 2008/0295731 A1 * | 12/2008 | Odell | B41J 2/175 106/31.13 |
| 2009/0186993 A1 * | 7/2009 | Noro | C08G 65/336 525/474 |
| 2013/0271526 A1 | 10/2013 | Ciampini et al. | |
| 2014/0049034 A1 | 2/2014 | Groetzner et al. | |
| 2016/0230030 A1 * | 8/2016 | Tominaga | B41M 5/0017 |

OTHER PUBLICATIONS

Indian Office Action (First Examination Report) in counterpart Indian Application No. IN201817047747 dated Oct. 3, 2019.

* cited by examiner

MULTICOMPONENT REACTIVE INKS AND PRINTING METHOD

FIELD OF THE INVENTION

The invention relates to printing systems for printing security features. In particular the presented invention provides a new method to print an image with hidden patterns (latent images), suitable for use in security applications as e.g. a security feature. The invention also relates to a printed object obtained by the method.

BACKGROUND OF THE INVENTION

In the following we will define certain terms as they should be understood according to the present description.

The term "security feature" describes an element that can be used for authentication purposes. Such a security feature can be in any form, i.e. an image or a graphic element. It may comprise a serial number, a printed text, a printed pattern, a designs or code made of a security ink, an intaglio printed pattern or design, a security thread or stripe, a window, fibers, planchettes, a foil, a decal, an hologram, microprintings, a 3-D security ribbon, and/or watermarks. Further the security feature as described herein may comprise a pattern representing a code selected from the group comprising special characters, series of alphanumerical characters and combinations thereof. Alternatively, the security feature may comprise a 1-dimensional barcode, a stacked 1-dimensional barcode, a 2-dimensional barcode (such as a DataMatrix or a QR-Code) and/or a 3-dimensional barcode. Such a code may comprise additional or redundant information in an encoded form so that it is generally not readable or understandable without a key or a procedure to decode the encoded information. The security feature may further be invisible to the naked eye.

An "image" according to this description can be an image that is immediately detectable with the naked eye, or can be a latent image, as defined below. An "image" can also comprise one or more areas that is/are immediately detectable by the naked eye, and/or one or more areas forming a latent image. A printed object comprises an image as defined above, and in one embodiment of the present invention the printed object is in the form of a security feature.

"Latent images" according to this description may comprise images comprising hidden patterns, which are not immediately detectable with the naked eye, but become detectable after a suitable physical, mechanical or chemical treatment or illumination. Latent images may be used in security applications as a security feature. Examples are pressure-sensitive or hot stamped labels with a normal (gray or colored) appearance. When viewed via a special filter (such as a polarizer) an additional, normally latent, image appears. Also so called bleeding inks can provide latent images, which appear or disappear only after specific physical, mechanical or chemical conditions are applied to said inks/images.

In the field of printing it is advantageous if the printed pattern shows good adhesion and mechanical properties on different surfaces, in particular on non-porous surfaces like glass, metals, plastics etc.

Furthermore, in certain applications it can be important that the printed codes are not easy to be reproduced or counterfeited. In order to obtain good adhesion and resistance of the printed image/pattern, the following two approaches are usually employed:

Ink solvent swelling of the medium, i.e. a process wherein the dye inside the ink penetrates the substrate Reticulation (cross-linking/fixation) of the ink induced by radiation, i.e. using an ink that contains reactive components (monomers, photoinitiators, etc.). "Reticulation" in general describes a polymerization, whereby monomers once reacted generate a crosslinked polymeric matrix.

Methods involving reticulation are employed, for example, in the processes described in the following documents.

U.S. Pat. No. 7,608,388 B2 relates to lithographic printing members imagable using a combination of inkjet and photopolymerization. The lithographic printing members are said to comprise a photosensitive top layer containing a photo-polymerizable moiety and the first component of a two-component photo-polymerization initiating system. This top layer contains acrylates having one or more reactive acrylic moiety which undergo photopolymerization and become crosslinked when reacted with an imaging fluid containing the second component of the two-component photo-polymerization initiating system and subjected to actinic radiation. Removal of the non-image portions of the top layer with a solvent allows a printing member with an imagewise lithographic pattern on it to be obtained.

U.S. Pat. No. 7,632,423 B2 describes reactive fine particles comprising one or more functional compounds such as latent curing agents. It also describes a liquid thermosetting compound comprising the reactive fine particles and adapted to be cured thereby, e.g. through initiation of cross linking and/or polymerization of the thermoset polymer. The liquid thermosetting compound may be used in the formulation of an ink.

U.S. Pat. No. 8,342,669 B2 relates to reactive ink components and methods for forming images using reactive inks. It describes an ink set comprising at least two inks that mix or combine to initiate a free radical polymerization reaction, thereby leading to image formation.

US 2013/0271526 A1 relates to a bicomponent reactive ink for ink jet printing, wherein the first component comprising a polymerizable epoxy monomer, and the second component comprising a polymerization catalyst. It also describes a method to employ the reactive ink comprising the step of separately jetting the two components of a bicomponent reactive ink composition onto a non-porous substrate, thereby promoting the cationic polymerization of the epoxy monomer.

U.S. Pat. No. 7,699,918 B2 relates to reactive ink components and methods for forming images using reactive inks. In particular, it describes a reactive ink set including three mixtures of radically polymerizable monomers. The first mixture includes a peroxide, the second mixture includes a peroxide decomposition agent, and the optional third mixture does not include a peroxide or a peroxide decomposition agent. A ink jetting device for use with the reactive ink set comprises different channels or reservoirs for storing and maintaining separation of the first, second and third inks. The inks are mixed or combined together before or during jetting onto a substrate or on a substrate after jetting, to thereby initiate the radical polymerization resulting in the formation of a hard, solid ink.

U.S. Pat. No. 8,807,697 B2 describes an encapsulated reactive ink and a method for forming images using the same. The ink includes at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component is encapsulated in a microcapsule; wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink. The rupture of the microcapsule may be triggered via exposure to radiation.

US 2005/0014005 A1 concerns ink-jettable reactive polymer systems for free-form fabrication of solid three-dimensional objects. It describes a method comprising a) ink-jetting a first ink-jettable composition containing a reactive build material and a second ink-jettable composition containing a curing agent separately onto a substrate such that contact between the reactive build material and the curing agent occurs, thereby resulting in a reaction that forms a solidifying composition, and b) repeating the ink-jetting step such that multiple layers of solidifying composition are accrued, wherein said multiple layers are successively bound to one another to form the solid three-dimensional object.

Specific methods to print security features are employed, for example, in the processes described in the following documents.

US 2014/0049034A1 relates to print product for use as spare part of vehicle brake, which has two line structures including two sets of parallel lines that are applied on printing substrate, where structures are printed using ink that includes color pigments with tilt effect.

U.S. Pat. No. 6,245,711B1 discloses a thermosensitive recording material for register receipts and ATM receipts, which has a latent image which forms pseudo watermark and/or comprises pigment or dye with variable light absorption and/or transmission properties.

U.S. Pat. No. 7,845,572B2 discloses a method of incorporating latent image in apparent solid-color background for representing desired solid color background having target color, comprising printing underlying solid-color background and line-screen patterns on print medium.

U.S. Pat. No. 6,306,929B1 discloses a bleeding ink especially for use in the printing of security documents which comprises a dyestuff and solid binder matrix forming compound(s) by polymerization and/or crosslinking, for use in bank cheques or shares.

However, in all of these methods printing and reticulation results in the formation of images wherein polymer fixing the image exhibits properties that are uniform throughout, meaning that they are not suitable for preparing images with hidden patterns (latent images) in a single-pass operation.

These printing systems exhibit the disadvantage that a print on porous and non-porous surfaces with good mechanical properties and adhesion is very difficult to achieve. An image characterized by the presence of areas with different physical, chemical and mechanical properties (hardness, rub resistance, solvent resistance, adhesive tape resistance) is very difficult to realize. Areas with different properties cannot form easily, for example, a latent image.

Furthermore, these printing systems are very cumbersome, slow, expensive, non-flexible, and cannot produce latent images with high resolution, contrast and good control of the physical and chemical properties.

Objective

The object of the invention is to solve the above cited disadvantages exhibited by the present state of the art.

The objective addressed by the invention claimed herewith is, in particular, the provision of a new printing system that allows the incorporation of more than one polymer into the same printed image (pattern, text, graphic, etc.) in a single-pass operation to thereby enable the formation of one or more images usable as a security feature in security applications. In one embodiment, the one or more images comprise a latent image, and in a further embodiment the one or more images are latent images.

Object of the invention is also to provide an inexpensive, compact, rapid, flexible printing system for printing security features capable of printing rapidly with high resolution latent, not immediately optically detectable images or codes, whereby a print on both porous and non-porous surfaces with good mechanical properties and adhesion is achieved, and whereby an image characterized by the presence of areas with different physical, chemical and mechanical properties (hardness, rub resistance, solvent resistance, adhesive tape resistance etc.) can be easily and rapidly obtained.

SUMMARY OF THE INVENTION

The object of the invention is achieved by a printing system exhibiting the features of independent claim 1, by the method using this printing system, and by the printed object obtained by the method using this system.

The dependent claims show preferred embodiments of the invention.

BRIEF DESCRIPTION OF THE DRAWINGS

The present invention will be described for the sake of better understanding by way of exemplary embodiments. These embodiments may be best understood by taking the following drawings in consideration. In these figures.

DETAILED DESCRIPTION OF THE INVENTION

Printing System

According to the invention a printing system is provided for printing a security feature, preferably in form of a latent image, comprising at least three compositions (RI), (C1) and (C2), wherein (RI) is a reactive ink comprising a silane compound (A) comprising at least a first and a second polymerizable moiety which are different from each other and are polymerizable by different mechanisms, loaded in a first reservoir of a first printhead, (C1) is a first catalyst composition comprising a substance able to react with the silane compound (A) of composition (RI) and promote the polymerization of the first polymerizable moiety, loaded in a second reservoir of said first printhead or of a second printhead, an (C2) is a second catalyst composition comprising a substance able to react, alone or in presence of composition (C1), with the silane compound (A) of composition (RI) and promote the polymerization of the second polymerizable moiety.

The latent image can be any form containing one or more latent images like for example text, regions, graphics or all other printable forms.

A "polymerizable moiety" hereby means any reactive chemical group present in a silane compound (A) able to form a polymer by either reacting with an identical group or a different group present in another molecule of the silane compound (A), to thereby form a new bond between the molecules and to form a polymer macromolecule that contains at least two, but typically three, four or more repeating units, each of which is derived from a molecule of the silane compound (A).

Examples of a polymerizable moiety capable of forming a polymer by reacting with an identical group (i.e. a polymerizable moiety) in another molecule include an ethylenically unsaturated group having a carbon-carbon double bond, which can react with each other by radical polymerization. Herein, the ethylenically unsaturated group denotes a group having an internal double bond between two carbon atoms at any position of a molecule but at its terminal, but also includes a terminal unsaturated group, also known as vinyl group (—C=CH$_2$). For steric reasons, the vinyl group may be preferred, as it generally shows a higher reactivity. The ethylenically unsaturated also includes e.g. (meth)acrylate groups of the formula —OC(O)—C(H or CH$_3$)=CH$_2$. The ethylenically unsaturated group also includes vinyl ester groups of the formula —C(=O)OC(H or CH$_3$)=CH$_2$.

Further examples of a polymerizable moiety capable of forming a polymer by reacting with an identical group (i.e. a polymerizable moiety) in another molecule include an epoxy group, which can react with another epoxy group by cationic or anionic ring-opening polymerization to form a polyether. Other examples of a group capable of forming a polymer by reaction with an identical group include generally any group capable of ring-opening polymerization, such as group containing an ethylenically unsaturated group in a ring group (e.g. a cyclic alkene), a cyclic ether, a lactone group, a lactam group, or an azidine group, leading to the formation of a polyalkylene, a polyether, a polyester, a polyamide, or a polyamine, respectively.

Other examples of a polymerizable moiety in a molecule of the silane compound (A) capable of forming a polymer by reacting with an identical group (i.e. an identical polymerizable moiety) in another molecule of the silane compound (A) include groups capable of forming a siloxane polymer. This siloxane polymer may e.g. be formed by a condensation reaction. One example of such a condensation reaction is the formation of a siloxane polymer by polycondensation of alkoxy silane groups, releasing the respective alcohol. In one embodiment, the alkoxy silane group is a trialkoxy silane group, wherein the alkoxy groups can be the same or different and are preferably selected from alkoxy groups having 1 to 6 carbon atoms, more preferably 1 to 4 carbon atoms, and further preferably 1 or 2 carbon atoms. Examples include a trimethoxysilane group, a triethoxysilane group, and a tripropoxysilane group, with a triethoxysilane being preferred.

Another example of a group capable of forming a siloxane polymer is a silane group carrying halogen atoms, i.e. a group having an Si-Halogen bond. These groups can react upon contact with water to form the respective H-Halogen and Si—OH species, the latter of which then condensate to form a siloxane linkage Si—O—Si. The group can be a trihalosilane group, such as a trichlorosilane group.

If the polymerizable moiety in a molecule of the compound (A) shall be capable of forming a polymer by reacting with a different group (i.e. a different polymerizable moiety) in another molecule of the compound (A), then these groups need to appropriately selected to provide for a combination of groups capable of forming a polymer by formation of a new bond. An example of such a combination is the presence of both a hydroxyl group and a carboxylic acid group in one molecule of compound (A), allowing the formation of the respective polyester. Another example of a suitable combination is the presence of a hydroxy group and an isocyanate group in one molecule of a compound (A), allowing for the formation of the respective polyurethane.

In the present invention, the compound (A) comprises at least a first and a second polymerizable moiety that are different from each other and that are polymerizable by different mechanisms. As e.g. the formation of a polyurethane polymer by reaction of a hydroxyl group present in one molecule of a compound (A) and an isocyanate group in another molecule of a compound (A) is a polymerization by the same (i.e. not different) polymerization mechanism, the presence of these two groups is not sufficient for satisfying the requirement of claim 1 that the first and second polymerizable moiety must be polymerizable by different mechanism. In consequence, in such a case a further polymerizable moiety different form a hydroxyl group and an isocyanate group must be present in the compound (A), e.g. a group capable of forming a siloxane, as described above.

To give an example, one molecule of the compound (A) may comprise a hydroxyl group, an isocyanate group, and a trialkoxysilane group. In this example, the compound comprises at least a first and second polymerizable moiety (the hydroxyl group, the isocyanate group and the trialkoxysilane group) that are different from each other and that are polymerizable by different mechanisms (polyurethane formation by the hydroxyl group and the isocyanate group, and polysiloxane formation by the trialkoxysilane group).

It follows that in cases where one molecule of the silane compound (A) comprises a polymerizable moiety that is capable of reacting with a different group present in another molecule of the compound (A) by a first mechanism, a further polymerizable moiety that is polymerizable by a second mechanism needs to be present in the compound (A), the second mechanism being different from the first mechanism.

Further, one molecule of the compound (A) may comprise both the polymerizable moiety that is capable of reacting with a different polymerizable moiety present in another molecule of the compound (A) as well as that different moiety, so that one molecule may comprise for instance both a hydroxyl group and a isocyanate group, in addition to a polymerizable moiety that is polymerizable by a different mechanism (e.g. for forming a polysiloxane).

The compound (A) may however also be formed by two or more different species, wherein one of the two or more species comprises one polymerizable moiety (e.g. a hydroxyl group) capable of reacting with another group (e.g. an isocyanate group) in another one of the two or more species. The compound (A) may for instance be formed by a first silane compound having a trialkoxy silane group and a hydroxyl group, and a second silane compound (A) having a trialkoxysilane group and an isocyanate group.

In each case, the one or more compounds (A) are selected such that a first polymerization reaction (e.g. for the formation of a polysiloxane) can be promoted by contact with the first catalyst composition (C1), and a second polymerization reaction (e.g. for the formation of a polyurethane by reaction of a hydroxyl group and an isocyanate group, or for the formation of an epoxide by cationic or anionic ring-opening polymerization of an epoxide) can be promoted by contact with the second catalyst composition. Both the first polymerization and the second polymerization are effected between the same compounds (A), so that upon contact with both the catalyst composition (C1) and (C2), two different bond-forming reactions take place between two molecules of the compound (A). Thereby, two different bonds are formed, such as a siloxane linkage Si—O—Si due to reaction of two trialkoxysilane groups and an ether linkage due to reaction of two epoxy groups.

In one embodiment, one of the at least first and second polymerizable moiety in the compound (A) is a group capable of forming a polysiloxane, such as a tri-$C_{1-6}$-alkoxysilane group, and another one of the at least first and second polymerizable moiety is a group capable of forming a polymer other than a polysiloxane, e.g. selected from an epoxy group or other cyclic ether group, an ethylenically unsaturated group (including a vinyl group, an (meth)acrylate group and a vinyl ester group), a tetrasulfide group, an amino group, a carboxylic acid ester group, or a hydroxyl group or a thiol group. Of these, an epoxy group, an ethylenically unsaturated group and an amino group are preferred.

It is a requirement of the present invention that the first and second polymerizable moiety are polymerizable by different mechanism. The mechanism referred to here are well known to a skilled person and include cationic polymerization, anionic polymerization, radical polymerization, and polycondensation. Each of these can be promoted by suitable catalysts present in the first or second catalyst composition. For instance, cationic polymerization can be promoted by using an acidic catalyst or using an acidic aqueous solution having a pH<7, whereas anionic polymerization can be promoted by using alkaline substances of alkaline aqueous solutions having a pH>7. Radical polymerization can be promoted by a radical initiator. Also, redox initiators (i.e. oxidation and reducing agents) can be used.

According to a preferred embodiment of the invention the reactive ink (RI) and/or the first catalyst composition (C1) and/or a second catalyst composition (C2) comprise a dye and/or a pigment.

Further it can be advantageous if one of the first and the second polymerizable moiety in the silane compound (A) is an epoxide group, an alkoxysilane group, a (meth)acrylic group, a vinyl group and an amino group.

The silane compound (A) might be further a compound of formula (i) or (ii):

$$R^1{}_3Si\text{-}L\text{-}S_4\text{-}L\text{-}SiR^1{}_3 \quad (i)$$

wherein L is $C_{1-6}$-alkylene, and RI each independently is $C_{1-6}$-alkoxy or halogen; or $$R_nSi(R^1)_m \quad (ii)$$

wherein n=1 or 2, (n+m)=4, and R each independently is vinyl, phenyl, or $C_{1-6}$-alkyl optionally substituted with one or more group(s) selected from epoxy, epoxy-($C_{1-6}$)-alkyloxy, $C_{5-7}$-cycloalkyl having an epoxide functionality, cyano, halogen, amino, $C_{1-6}$-alkylamino, di($C_{1-6}$_alkyl)amino, amino-C1-6-alkylamino, acryloyloxy, methacryloyloxy, and vinyl; with at least one R being vinyl, phenyl, or substituted $C_{1-6}$-alkyl.

Preferably in such a printing system $R^1$ is $C_{1-6}$-alkoxy and n=1. Even more preferably all groups $R^1$ are the same and are selected from methoxy, ethoxy and propoxy.

According to a further preferred embodiment the silane compound (A) is selected from (3-glycidyloxypropyl)trimethoxysilane (e.g. Silquest A187, GPS), aminopropyltriethoxysilane (e.g. APTES), N—(β-aminoethyl)-γ-aminopropyltrimethoxysilane (e.g. Silquest A-1120, Momentive), 3-methacryloxypropyltrimethoxysilane (e.g. Silquest A-1120, Momentive), vinyltrimethoxysilane (e.g. Silquest A-171, Momentive), trimethoxy[2-(7-oxabicyclo[4.1.0]hept-3-yl)ethyl]silane (e.g. Sigma-Aldrich), and bis[3-(triethoxysilyl)propyl] tetrasulfide (e.g. Sigma-Aldrich).

The reactive ink RI may comprise the silane compound A typically between 0.1% Wt and 25% Wt, preferably between 2.5% Wt and 20% Wt, more preferably between 5% Wt and 15% Wt, based on the total weight of the reactive ink composition RI.

Other organosilanes (from Sigma-Aldrich) suitable as silane compound (A) for reactive ink RI are for example
3-Cyanopropyltrichlorosilane $C_4H_6Cl_3NSi$;
3-Cyanopropyltriethoxysilane $C_{10}H_{21}NO_3Si$;
Dichlorodiphenylsilane $Cl_2H_{10}Cl_2Si$;
Diethoxy(3-glycidyloxypropyl)methylsilane $C_{11}H_{24}O_4Si$;
Diethoxy(methyl)vinylsilane $C_7H_{16}O_2Si$;
[3-(Diethylamino)propyl]trimethoxysilane $C_{10}H_{25}NO_3Si$;
Dimethoxy-methyl(3,3,3-trifluoropropyl)silane
 $C_6H_{13}F_3O_2Si$;
Dimethoxymethylvinylsilane $C_5H_{12}O_2Si$;
(N,N-Dimethylaminopropyl)trimethoxysilane $C_8H_{21}NO_3Si$;
Allytrimethoxysilane $C_6H_{14}O_3Si$;
Ethyltrichlorosilane $C_2H_5Cl_3Si$;
Triethoxyvinylsilane $C_8H_{18}O_3Si$;
Trimethoxy[2-(7-oxabicyclo[4.1.0]hept-3-yl)ethyl]silane
 $C_{11}H_{22}O_4Si$;
3-(Trimethoxysilyl)propyl acrylate $C_9H_{18}O_5Si$;
Trimethoxy[3-(methylamino)propyl]silane $C_7H_{19}NO_3Si$;
Trimethoxy(octadecyl)silane $C_{21}H_{46}O_3Si$;
Trimethoxy(7-octen-1-yl)silane $C_{11}H_{24}O_3Si$;
2-[(Trimethylsilyl)ethynyl]anisole $C_{12}H_{16}OSi$;
Tris[3-(trimethoxysilyl)propyl] isocyanurate
 $C_{21}H_{45}N_3O_{12}Si_3$;
Trimethoxy(3,3,3-trifluoropropyl)silane $C_6H_{13}F_3O_3Si$
3-(Triethoxysilyl)propyl isocyanate $C_{10}H_{21}NO_4Si$;
Good results could be achieved if (RI) and/or (C2) further
 comprises (mercaptopropyl)trimethoxysilane (3-MPTS).
Preferably (C1) is a solution having a pH of ≥8, preferably >8, more preferably ≥9. Even more preferably, (C1) is a solution of an amine, a hydroxide, or a carbonate or hydrogen carbonate of ammonium, tetramethylammonium or an alkaline or alkaline earth metal.

The composition C1 is preferably basified water (optionally polyols can be added) and promotes the polymerization of the polymerizable moieties alkoxysilanes or halosilanes.

Preferred substances which are comprised in first compositions C1 are able to react with the silane compound (A) of composition (RI) and promote the polymerization of the first polymerizable moiety. Examples are NaOH; TMAOH; KOH (potassium hydroxide) (Sigma-Aldrich); LiOH (lithium hydroxide) (Sigma-Aldrich); K2CO3 Potassium carbonate (Sigma-Aldrich); RbOH Rubidium hydroxide (Sigma-Aldrich); $Na_2CO_3$ Sodium carbonate (Sigma-Aldrich); $Rb_2CO_3$ Rubidium Carbonate (Sigma-Aldrich); $Li_2CO_3$ Lithium carbonate (Sigma-Aldrich); CsOH Cesium hydroxide (Sigma-Aldrich); $Cs_2CO_3$ Cesium Carbonate (Sigma-Aldrich); $NH_4OH$ Ammonium hydroxide (Sigma-Aldrich); $NH_4CO_3$ Ammonium carbonate (Sigma-Aldrich); $C_8H_{21}NO$ Tetraethylammonium hydroxide (Sigma-Aldrich); $C_{24}H_{53}NO$ Tetrahexylammonium hydroxide (Sigma-Aldrich); $C_{12}H_{29}NO$ Tetrapropylammonium hydroxide (Sigma-Aldrich).

The above mentioned ingredients are preferably diluted into water, in order to obtain solutions having pH equal to or higher than 9.

The first compositions C1 comprises said basic substances typically between 0.01% Wt and 20% Wt, preferably between 0.1% Wt and 10% Wt, more preferably between 1% Wt and 5% Wt, based on the total weight of the first compositions C1.

The first compositions C1 comprises water typically between 0.1% Wt and 75% Wt, preferably between 1% Wt and 50% Wt, more preferably between 10% Wt and 40% Wt, based on the total weight of the first compositions C1.

The basic solutions (NaOH, LiOH, KOH, etc. . . . ) is able to promote the deprotonation of thiolic functionalities, which initiate the anionic ring opening of epoxy groups (or react with other functionalities by anionic mechanisms); at the same time, the water basic solution promotes the hydrolysis of the alkoxy functionalities of the organosilane molecules.

Weaker basic solutions can also catalyze different reactions such as, for example, condensation reactions between carboxylic acids and alcohols.

According to another embodiment of the invention (C2) is a solution having a pH of ≤7, preferably <7, more preferably ≤5. Hereby (C2) could for example comprise an acid selected from hexafluoroantimonic acid ($HSbF_6$), sulfuric acid ($H_2SO_4$), hydrochloric acid (HCl), triflic acid ($CF_3SO_3H$), and hexafluorophosphoric acid ($HPF_6$).

As substances able to react with the silane compound (A) of composition (RI) and promote the polymerization of the second polymerizable moiety, the composition C2 can advantageously comprise primary and secondary amines, amides, thiols, anhydrides and superacids, and mainly promote the polymerization of epoxy and vinyl groups.

Alternatively, composition C2 can advantageously comprise radical initiators such as peroxides, and promote the polymerization of ethylenically unsaturated (e.g. vinylic, acrylic and methacrylic) groups.

The second compositions C2 comprises said substances typically between 0.1% Wt and 25% Wt, preferably between 2.5% Wt and 20% Wt, more preferably between 5% Wt and 15% Wt, based on the total weight of the first compositions C2.

Preferred substances comprised in second compositions C2 able to react with the silane compound (A) of composition (RI) and promote the polymerization of the second polymerizable moiety are (from Sigma-Aldrich) Mercaptopropyl trimethoxy silane (3-MPTS); 1,5,7-Triazabicyclo [4.4.0]dec-5-ene $C_7H_{13}N_3$; Triethylamine $C_6H_{15}N$; 2,2'-(Ethylenedioxy)diethanethiol $C_6H_{14}O_2S_2$; 2,3-Butanedithiol $C_4H_{10}S_2$; Benzene-1,4-dithiol $C_6H_6S_2$; 1,16-Hexadecanedithiol $C_{16}H_{34}S_2$; 1,2-Ethanedithiol $C_2H_6S_2$; 1,3-Propanedithiol $C_3H_8S_2$; 1,4-Butanedithiol $C_4H_{10}S_2$; 1,5-Pentanedithiol $C_5H_{12}S_2$; 1,6-Hexanedithiol $C_6H_{14}S_2$; 1,6-Hexanedithiol $C_6H_{14}S_2$; 1,8-Octanedithiol $C_8H_{18}S_2$; 1,9-Nonanedithiol $C_9H_{20}S_2$; 1,9-Nonanedithiol $C_9H_{20}S_2$; Benzoyl peroxide, Luperox A70S $C6H5CO)2O2$; Dicumyl peroxide $[C_6H_5C(CH_3)_2]_2O_2$; Tin(II) 2-ethylhexanoate $[CH_3(CH_2)_3CH(C_2H_5)CO_2]_2Sn$; Tetrakis(triphenylphosphine)palladium(0) $C_{72}H_{60}P_4Pd$; Palladium(II) acetate $C_4H_6O_4Pd$.

Other suitable substances comprised in second composition C2 are $HSbF_6$ (hexafluoroantimonic acid) (Sigma-Aldrich); $H_2SO_4$ (sulfuric acid) (Sigma-Aldrich); HCl (hydrochloric acid) (Sigma-Aldrich); $CF_3SO_3H$ (triflic acid) (Sigma-Aldrich).

The above mentioned ingredients usually are diluted into water, in order to obtain solutions having pH equal to or lower than 5.

The superacid solutions (for example $HSbF_6$, $HPF_6$, Triflic acid, etc.) may be capable to promote a cationic reaction of the epoxy groups (or other cationically reactive sites) and, at the same time, promote the hydrolysis of alkoxy functionalities.

Weaker acids like $H_2SO_4$, HCl, etc. are able to catalyze hydrolysis reactions of the alkoxy functionalities and promote eventually different reactions involving other functionalities (condensations of carboxylic groups and alcohols, acylic halogenide and alcohols, etc. . . . ).

Advantageously (C1) and/or (C2) comprise a mixture of water and ethanol as a solvent, wherein the percentage of water with respect to ethanol advantageously is between about 25 wt % and 75 wt %; preferably between 35 wt % and 65%, more preferably between 40 wt % and 60 wt %, based on the total weight of the mixture of water and ethanol.

In certain applications according to preferred embodiments of the invention one or more of (RI), (C1) and (C2) further comprises a surfactant.

Preferably the dye is comprised in (RI) and is selected from Solvent Black 27; and/or Solvent Black 29 (e.g. Sigma-Aldrich). The reactive ink (RI) or the first catalyst composition (C1) or a second catalyst composition (C2) comprises preferably a dye.

Said compositions comprise said dye typically between 0.1% Wt and 10% Wt, preferably between 0.5% Wt and 7.5% Wt, more preferably between 1% Wt and 5% Wt, based on the total weight of said compositions.

Other dyes might include Black Intraplast RLS (Sensient); $C_{21}$—$H_{21}$—$N_3$—$O_4.C_{16}$—$H_{11}$—$N_3$—$O_4$.Cr; Acid blue 40 $C_{22}H_{16}N_3NaO_6S$; Acid blue 80 $C_{32}H_{28}N_2Na_2O_8S_2$; Acid blue 113 $C_{32}H_{21}N_5Na_2O_6S_2$; Acid blue 120 $C_{33}H_{23}N_5Na_2O_6S_2$; Acid blue 129 $C_{23}H_{21}N_2NaO_5S$; Acid orange 8 $C_{17}H_{13}N_2NaO_4S$; Acid orange 74 $C_{16}H_{11}CrN_5NaO_8S$; Acid red 1 $C_{18}H_{13}N_3Na_2O_8S_2$; Acid red 97 $C_{32}H_{20}N_4Na_2O_8S_2$; Acid red 114 $C_{37}H_{28}N_4Na_2O_{10}S_3$; Acid red 183 $C_{16}H_{11}C_1N_4Na_2O_8S_2$ xCr; Acid Yellow 17 $C_{16}H_{10}Cl_2N_4Na_2O_7S_2$; Acid Yellow 25 $C_{23}H_{20}N_5NaO_6S_2$; Acridine ($C_{13}H_9N$); Alcian blue 8GX ($C_{56}H_{68}Cl_4CuN_{16}S_4$); 1-Aminoanthraquinone ($C_{14}H_9NO_2$); Azobenzene ($C_6H_5N$=$NC_6H_5$); Anthrone ($C_{14}H_{10}O$); Alcian blue ($C_{56}H_{40}Cl_4CuN_{12}$); Alizarin ($C_{14}H_8O_4$).

The reactive ink (RI) or the first catalyst composition (C1) or a second catalyst composition (C2) comprises preferably a pigment.

Said compositions comprise said pigment typically between 0.1% Wt and 10% Wt, preferably between 0.5% Wt and 7.5% Wt, more preferably between 1% Wt and 5% Wt, based on the total weight of said compositions.

Suitable pigments are for example Pigment Orange 5 ($C_{16}H_{10}N_4O_5$) Sigma Aldrich; Pigment Red 53 ($C_{17}H_{12}ClN_2NaO_4S$) Sigma Aldrich; Pigment Yellow 1 ($C_{17}H_{16}N_4O_4$) Sigma Aldrich; Pigment Yellow 3 ($C_{16}H_{12}Cl_2N_4O_4$) Sigma Aldrich; Pigment Blue 15 ($C_{32}H_{16}CuN_8$) Sigma Aldrich; Pigment Red 3 ($C_{17}H_{13}N_3O_3$) Sigma Aldrich; Pigment Red 224 ($C_{24}H_8O_6$) Sigma Aldrich.

One or more of (RI), (C1) and (C2) comprises preferably a surfactant. A surfactant, in general, improves the performance of the ink. Furthermore, a surfactant is beneficial for an ink contained inside a printing ink jet system, in order to guarantee the proper surface tension of the composition inside the printhead.

The surfactant is also beneficial for surface wetting, particularly when printing is carried out on low surface energy materials, such as plastics.

Said compositions comprise said surfactant typically between 0.01% Wt and 10% Wt, preferably between 0.05% Wt and 5% Wt, more preferably between 0.1% Wt and 2.5% Wt, based on the total weight of said compositions.

Preferred used surfactants are (Sigma-Aldrich supplier): Polyoxyethylene (5) nonylphenylether, branched. IGEPAL® CO-520 ($(C_2H_4O)_n$ $Cl_5H_{24}O$, n~5; Di(ethylene glycol) hexyl ether ($CH_3(CH_2)_5OCH_2CH_2OCH_2CH_2OH$); Ethylenediamine tetrakis(ethoxylate-block-propoxylate) tetrol [—$CH_2N[(—CH_2CH_2O—)_x[—CH_2CH(CH_3)O—]_yH]_2]_2$; Ethylenediamine tetrakis(propoxylate-block-ethoxylate) tetrol. Tetronic 701. [—$CH_2N[(—CH_2CH(CH_3)O—)_x[—CH_2CH_2O—]_yH]_2]_2$; Polyoxyethylene (150) dinonylphenyl ether, Polyoxyethylene, dinonylphenyl and nonylphenyl ethers, branched. IGEPAL DM970 ($(C_2H_4O)_n$ $C_{24}H_{42}O$ $C_{15}H_{24}O$; Poly(ethylene glycol)-block-poly(propylene glycol)-block-poly(ethylene glycol); Triton N101; Triton X100; Zonyl FSO-100 ($(C_2H_4O)x(CF_2)_yC_2H_5FO$; Zonyl FSO fluorosurfactant ($(C_2H_4O)_x(CF_2)_yC_2H_5FO$.

Other possible used surfactants are (Byk-Chemie) Byk 346 (Silicone surfactant); Byk 345 (Silicone surfactant); Byk 315N (Silicone surfactant); Byk 310 (Silicone surfactant); Byk 066 (Silicone surfactant); Byk 333 (Silicone surfactant); Byk 348 (Silicone surfactant); Byk-361N (Polyacrylate surfactant); Byk 381 (Polyacrylate surfactant); Byk 3455 (surfactant for UV systems); Byk 1794 (surfactant for UV systems).

The separation of the reactive compositions in different reservoirs according to a preferred embodiment of the invention prevents any viscosity increase or polymerization during the life time inside the printhead.

Thanks to the printing system comprising one or more printheads filled with a set of reactive compositions RI according to a preferred embodiment of the invention, C1 and C2 can be used, in order to obtain an image on both porous and non-porous surfaces with good mechanical properties and adhesion.

Substrates to print are, for example PVC (polyvinyl chloride); PC (polycarbonate); PET (polyethyleneterephtalate); HDPE and LDPE (polyethylene high density and low density); COC (cycloolefinic copolymer); COP (cycloolefinic polymer); Nylon; Aluminum; Copper; Gold; Silicon; Silicon carbide; Silicon oxide; Iron; Steel; Nickel; Glass; Paper.

Further according to the invention it is provided a method for preparing a printed object in the form of a security feature, using any of the printing systems as described comprising the steps of
(1) printing on a substrate using the reactive ink (RI),
(2) reticulating a first selected area of the image by ejecting the catalyst composition (C1) onto it, and
(3) reticulating a second selected area of the image by ejecting the catalyst composition (C2) onto it.

According to a preferred embodiment of the invention the printed object is a security feature, preferably containing one or more latent images like for example text, regions, graphics or all other printable forms.

With a printing system according to the invention a security feature in the form of a latent image can be easily and rapidly printed, for example onto a security article.

A security feature or a label can be easily and rapidly manufactured according to the method proposed by the present invention.

The authenticity of the security feature or label can be then verified very easily by submitting it to one or more of said indicated external actions.

Advantageously, it's possible to print a text as a label in which different letters or words are made by different polymers and exhibit different chemical, physical and mechanical properties. In order to verify the authenticity of the label, it's possible to execute some non-destructive tests, as external actions, like indentation of the different words or letters. Such a mechanical measurement can sort out the authenticity of the label.

Thanks to the present invention it is possible, in particular, to mark and authenticate security articles with high security.

As used herein, the term "security article" refers to an article which is usually protected against counterfeit or fraud by at least one security feature.

The security article includes documents of various sizes, documents having specific known dimensions, bound documents, booklet-type documents, unbound documents, sheet-like documents, single-sheet documents, card-like documents and cards. Typical example of security articles include without limitation passports, identity cards, visas, driving licenses, company employee's identification badges, financial transaction cards such as for example bank cards, credit cards and transaction cards, access documents or cards, entrance tickets, public transportation tickets or titles, birth certificates, health cards permitting an individual to obtain medical services, and the likes.

A preferred embodiment of the invention comprises a printing system with printhead containing three or more reactive compositions (RI, C1, C2), able to react when they are ejected onto the substrate and mixed together at a temperature equal or lower than 60° C. The compositions printed onto the substrate generate an image (printed object) with good adhesion both on porous and non-porous media and physical and chemical properties variable in the different selected areas of the printed image. The used printing system can be one of those represented in FIG. 1, 2 or 3 and comprises preferably an ink-jet printhead.

Figure 1:
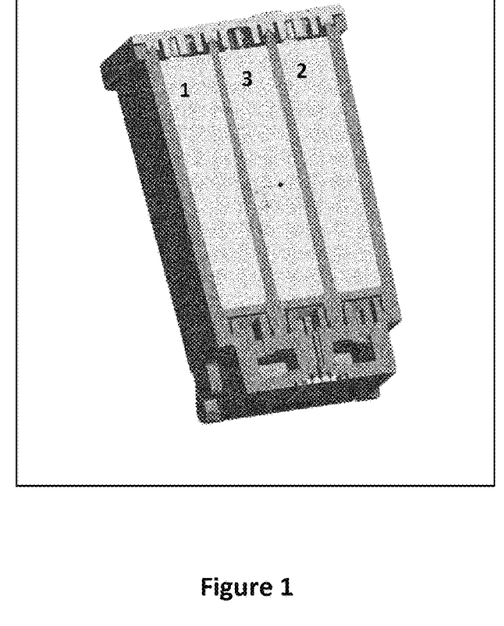
FIG. 1 shows a printing system according to an embodiment of the invention exhibiting a printhead with three reservoirs 1, 2 and 3.

In FIG. 1 the printhead according to an embodiment of the invention exhibits three reservoirs 1, 2 and 3.

RI is loaded in reservoir 1, C1 is loaded in reservoir 2, C2 is loaded in reservoir 3.

We have actually printed RI, C1 and C2 with good results on the substrates PVC, aluminum and paper.

The used printer was an internal testbed that works with a frequency of 10 kHz and a resolution of 600×600 dpi. The printing system was equipped with either color or monochrome thermal ink jet printheads.

An ink jet printhead, either monochrome or color, can deliver the ink in a controlled way: a sudden current pulse applied to the heater of an ejection chamber causes the emission of an ink drop onto a printing medium (substrate). By means of the relative movement between printhead and medium, a full area is printed. The capability to address an ink drop to a precise location on the printing medium can be used advantageously for the scope of the invention. In fact, the compositions in the different reservoirs can be subsequently ejected on the same medium location, covering substantially the same area on the substrate. For this purpose, a drop-on-drop printing mode was preferably adopted, to enable the full overlapping and thus the mixing of the reactive compositions, according to the claimed method. Alternatively, a suitable drop-near-drop printing mode can be used, provided that a partial overlap between the drops ejected from different reservoirs is achieved. In fact, the compositions with different composition don't need to be perfectly overlapped on the same substrate area, but it is essential that their overlap on the substrate is sufficient to promote a coalescence/mixing effect of the compositions.

Table 1 shows the compositions RI stored in reservoir 1.

Table 2 shows the compositions C1 stored in reservoir 2.

The composition C2 stored in reservoir 3 (Table 3) is B24.2, except for examples B or C or D.

Preparation Method of RI, C1 and C2

The compositions RI and C2 were prepared according to the following method:

Introduction into a glass jar of the following components in the order listed below:

1. Organosilane/s;
2. Dye or pigment (if present in the formulation);
3. Surfactant;
4. Organic solvent;
5. Mixing of the composition by means of a magnetic stirrer up to complete dissolution of the solid components.

The formulation C1 was prepared according to an analogous method, introducing into a glass jar the following components in the order listed below:

1. Base;
2. Dye or pigment (if present in the formulation);
3. Surfactant;
4. Water;
5. Organic solvent;
6. Mixing of the composition by means of a magnetic stirrer up to complete dissolution of the solid components.

A set of reactive compositions RI, C1, C2 can be loaded in different reservoirs of the same printhead or in different printheads.

When the different compositions are mixed in the correct ratio and temperature conditions, they polymerize and produce a solid polymeric material, whose optical, physical and mechanical properties depend on the formulation and ratio of the compositions, which have been deposited in that specific selected area.

Said compositions are able to react even at very low temperature (preferably <60° C.) in very short times (preferably less than 10 seconds), producing a dry printed image, with good adhesion to the substrate and variable properties as a function of the used compositions.

C1 reacts with the silane compound (A) of composition (RI) on the first selected area and promotes the polymerization of the first polymerizable moiety, producing a first polymer.

C2 reacts with the silane compound (A) of composition (RI) on the second selected area and promotes the polymerization of the second polymerizable moiety, producing a second polymer.

First and second polymer exhibit the same backbone of the silane compound (A) and are not optically distinguishable, but exhibit different connecting chemical groups, respectively the first and second moiety, and exhibit therefore different physical, chemical and mechanical properties (hardness, rub resistance, solvent resistance, adhesive tape resistance).

An external action applied to the printed image can reveal the presence of the two different polymers, and reveal therefore a corresponding latent image, whose patterns were hidden before.

By loading different reactive compositions RI, C1, C2 in different reservoirs, an image can be produced, characterized by the presence of selected areas with different physical, chemical and mechanical properties (hardness, rub resistance, solvent resistance, adhesive tape resistance). The selected areas with different properties can be used to form a latent image.

Thanks to the invention, it's possible to print on a substrate an image (printed object) containing 1, 2 or more latent images. Said latent images can be revealed using different techniques and/or external actions: dipping in water, dipping in organic solvent, stripping with an adhesive tape, rubbing, etc. Each of these external actions removes a fraction of the printed image, which is characterized by a low resistance to said particular external action.

Figure 5:
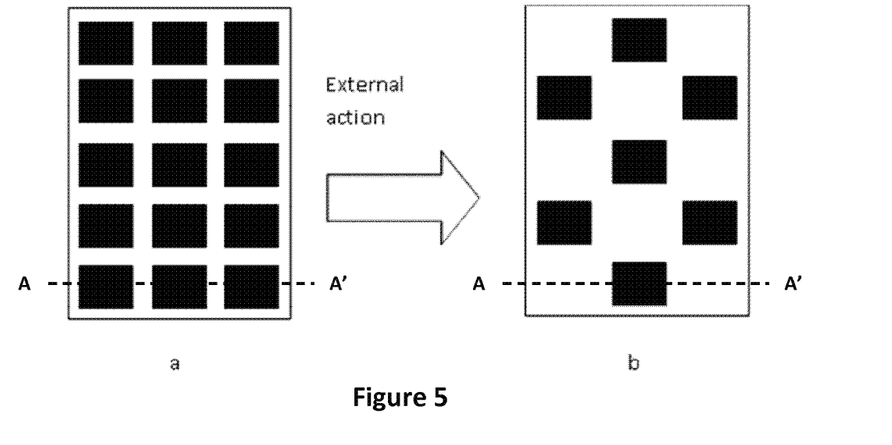
FIG. 5 depicts a) a printed image containing the latent image (hidden) before the external action; b) a latent image made visible after the external action.

As shown in FIG. 5 a), the printed image (or printed object) appears initially optically at a first sight as a first image, uniform from the point of view of the color density; the image doesn't exhibit particular thickness variations or gaps.

Carrying out a certain external action on said first printed image (for example, washing with water) a portion of said printed image soluble in water, for example, can be removed, allowing a second latent image to appear, as shown in FIG. 5 b).

Said second latent image can also comprise, for example, two other distinct selected areas, both resistant to water, but with different abrasion resistance: rubbing the printed image can remove the softer fraction making a third abrasion resistant latent image contained inside the second one to appear.

Thanks to the invention, it is therefore possible to produce several latent images, as long as there are selected areas of the printed image with different mechanical and physical properties detectable by different detection methods.

It is actually possible to detect the presence of latent images by means of several different external actions. For example, if the latent image comprises a polymeric crystalline fraction, this is detectable measuring its different specific thermal properties.

For example, if the printed image is heated above the melting point of the polymeric crystalline latent image, in this area a phase transition will occur involving a different temperature increase rate with respect to the other adjacent selected printed areas.

The latent image temperature variation can be measured, for example, by means of an infrared thermocamera (models such as FLIR 4298 or 4300, produced by FLIR).

The latent image would therefore appear and become evident as a thermal image in the infrared thermocamera.

It is also possible to detect a latent image by observing the different wettability of the selected various printed areas. Said detection can be simply executed by generating an aerosol of water drops onto the printed surface (for example, breathing onto the surface).

The more polar selected areas will be wetted more easily with respect to the less polar ones; consequently it will be possible to reveal a corresponding latent image.

If the number of reactive compositions contained in separate reservoirs is two, only one polymeric image can be obtained, without any latent image.

Increasing the number of reactive compositions to three it becomes possible to obtain two or even three different polymeric materials with different properties in different selected areas. Said polymeric areas can be used to form latent images.

The number of reactive compositions contained in different reservoirs can be increased to 4 or 5 or to any other integer, making possible to obtain an unlimited large number of printed latent images.

In this case, the printing system comprises additional catalyst compositions C3 or C4 etc. comprising a substance able to react with the other compositions and promote their polymerization.

Printing Method

The experimental method used for preparing the printed object comprises the steps of (1) printing an image on a substrate using the reactive ink (RI), (2) reticulating a first selected area of the image by ejecting the composition (C1) onto it, and (3) reticulating a second selected area of the image by ejecting the composition (C2) onto it.

The selected areas in step (2) and (3) are different. One of said selected areas becomes detectable and recognizable only following a specific physical, mechanical and/or chemical treatment, and forms therefore a latent image. (See FIG. 5 b))

EXAMPLES

Examples A

Examples of tested sets of three compositions RI, C1 and C2 on substrates PVC, aluminum, glass, polyethylene in the printing system of FIG. 1 exhibiting a printhead with three reservoirs named 1, 2 and 3 are:

RI: A composition containing a black dye, an organosilane named (3-glycidiloxypropyl)trimethoxysilane (GPS) or Silquest A171, ethanol and a surfactant (Table 1, composition B24.1 or B24.3);

C1: A composition containing a solution of tetramethyl ammonium hydroxide, or another alkaline water solution having a certain percent of ethanol and a surfactant (Table 2: B21C, B22C, B23C)

C2: A composition containing another organosilane named mercaptopropyl trimethoxy silane (3-MPTS), ethanol and a surfactant (Table 1, composition B24.2);

3-MPTS was loaded into the reservoir 3 as an anionic initiator for the epoxy polymerization. Reservoir 1 is filled with GPS and reservoir 2 contains basic water.

In order to obtain a polysiloxane monomer having unreacted epoxy moieties it is sufficient to print onto the same substrate selected area the compositions contained in reservoir 1 and 2. The composition in reservoir 3 printed later onto the produced image can impart to the polysiloxane polymer higher mechanical resistance and hardness.

Currently the tested preferred combination is B24.1 in reservoir 1, B22C in reservoir 2 and B24.2 in reservoir 3. Also combinations B24.1, B21C, B24.2 or B24.1, B23C, B24.2 have been tested with good results.

The ratio between the number of drop ejected from reservoirs 1 and 2 is preferably between 5:1 and 2:1.

The organosilane hydrolyzes and consequently polymerizes in a time comprised between 30 seconds and 1 minute at temperatures higher than or equal to 45° C. If the substrate is PVC or another material that can be deformed under heating, it is preferable to maintain the temperature under 50-55° C., in order to avoid such deformation.

For other substrates like glass, silicon or metals it is possible to increase the temperature of the substrate.

At the same time, only onto particular selected areas of the polysiloxane image the printhead ejects the composition contained in the third reservoir (composition B24.2).

The drops generated from the reservoir 3 are ejected with a time delay shorter than 2 minutes, preferably shorter than 1 minute and most preferably shorter than 30 seconds. The preferred ratio between the number of drops of the compositions contained in reservoirs 1 and 3 is comprised between 1:1 and 2:1, in order to achieve a fast epoxy ring opening reaction. The reaction takes place at 40° C. in less than 30 seconds on PVC, silicon, aluminum, glass, polyethylene.

The substrates used exhibit the following dimensions:
PVC: 30 cm×21 cm;
Aluminum: 15 cm×10 cm;
Glass: 30 cm×21 cm;
Polyethylene: 15 cm×10 cm.

The printed image obtained on the selected printed areas by using the compositions contained in reservoirs 1 and 2 is composed by a polysiloxane material exhibiting particular and distinguishable properties (like high wettability, in function of the polycondensation degree, high flexibility) well discriminable by the selected areas exhibiting also the epoxy-organosilane and thiol-organosilane produced by printing the composition in reservoir 3. These selected areas exhibit very high abrasion and chemical resistance and different properties in respect to the selected areas exhibiting only the polysiloxane material.

The printed layers can be then handled after 30 seconds at temperatures equals or lower to 50° C.

The produced printed image doesn't exhibit any colour density variation in the areas where all the three compositions have been deposited in the above mentioned proportions.

This is due to the absolute transparent character of the drops deposited onto the substrate and ejected from reservoir 3 (composition B24.2). Said drops penetrate into the polysiloxane layer having pendant epoxy groups and promote their anionic reaction catalyzed by a basic environment.

The produced latent image can be however detected by naked eye after washing the printed image with water at room temperature for 30 seconds.

An alternative tested method to reveal the latent image is the adhesive tape test, by pressing a tape from Sales codified 00559469-1 onto the complete printed image and removing it quickly.

Only the negative weak selected area of the produced latent image will be removed, i.e. composed by the pure polysiloxane polymer.

For the present examples, as well as for the next ones, the tested printed pattern is a chess-board pattern, exhibiting alternating regions printed with different compositions, which exhibit originally the same optical properties, without any contrast.

Figure 6:
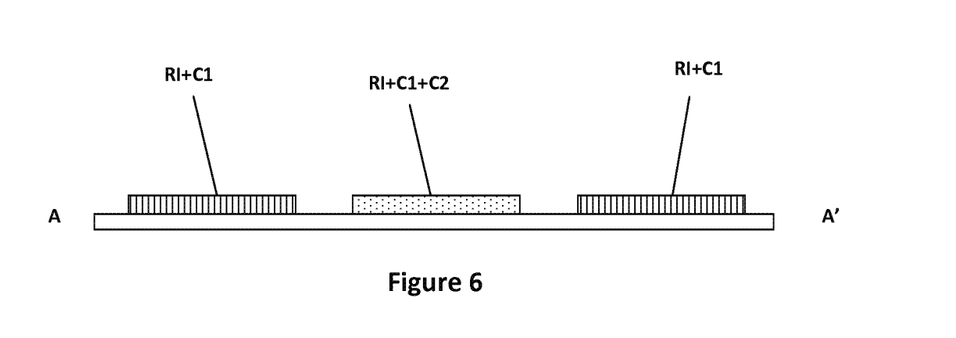
FIG. 6 shows a cross section along the line A-A' in FIG. 5 shows for examples A in detail the distribution of the different printed compositions onto the substrate.

After printing the pattern in FIG. 5 a), a well defined and detectable latent image has been easily and rapidly obtained (see FIG. 5 b). In FIG. 6 a cross section view along the line A-A' shows in detail the distribution of the different printed compositions onto the substrate.

Examples B

If the reactive molecules are 3-MPTS and GPS, it has been surprisingly and unexpectedly discovered that in absence of basic water (pH 8) it is also possible to maintain said two silanes into the same reservoir (composition B21, B22, B23 and B24) without any undesired premature reticulation.

3-MPTS can be favorably mixed with any of the compounds falling within the definition of the silane component (A).

3-MPTS is particularly beneficial for the properties of the image and has also influence on the polymerization reaction.

In this case, it was possible to obtain on the substrates PVC, aluminum, glass, polyethylene different polymeric structures in the printed image by printing with the printing system of FIG. 1 exhibiting a printhead with three reservoirs named 1, 2 and 3 filled in the subsequent order with all possible combinations of the following listed compositions:

1. A reactive ink RI containing organosilanes 3-MPTS and GPS, an organic solvent (MEK, absolute ethanol, etc. . . . ), a surfactant (all compositions B21, B22, B23 and B24 in Table 1 have been tested);

2. A composition C1 containing a water/ethanol based solution having pH higher than 8 (all compositions B21C, B22C, B23C in Table 2 have been tested);

3. A composition C2 comprising a water/ethanol based solution exhibiting pH=6.5:

Water: 32.4% Wt, Ethanol: 66% Wt, Byk 346: 1% Wt, based on the total weight of the composition.

The printed image obtained by ejecting onto a substrate the composition contained in reservoir 1 could be reticulated by ejecting onto said image the composition contained in reservoir 2, promoting simultaneously the hydrolysis of methoxy groups and anionic reaction of the epoxy group.

At the same time, it was also possible to promote the reaction of only methoxy groups by printing onto the image the composition contained in reservoir 3; in this latter case a polymer has been obtained exhibiting only siloxane bonds and/or silanol functionalities, which confer to the polymer higher flexibility and polarity with respect to the polymer obtained by using the catalyst composition contained in reservoir 2.

After having printed the pattern in FIG. 5 a), a well defined and detectable latent image has been easily and rapidly obtained (see FIG. 5 b)).

Figure 7:
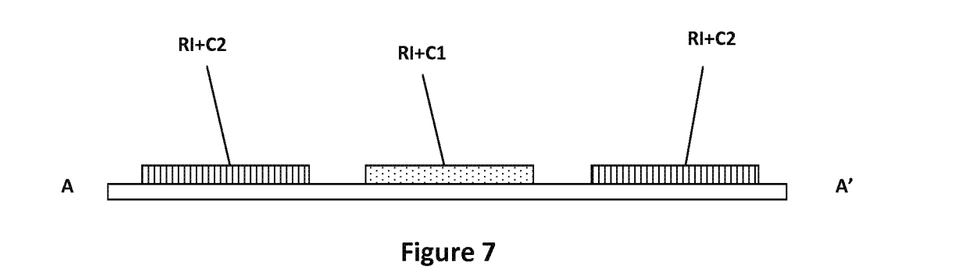
FIG. 7 is a cross section along the line A-A' in FIG. 5 for examples B showing in detail the distribution of the different printed compositions onto the substrate.

In FIG. 7 a cross section view along the line A-A' shows in detail the distribution of the different compositions onto the substrate.

The tested substrate dimensions were:
Aluminum: 15 cm×10 cm;
PVC: 30 cm×21 cm;
Glass: 30 cm×21 cm;
Polyethylene: 15 cm×10 cm.

Examples C

Tests have been also performed on both the substrates PVC, aluminum, steel, polyethylene by loading the printing system of FIG. 1 exhibiting a printhead with three reservoirs with all possible combinations of the following listed compositions:

1. A reactive ink RI containing organosilanes GPS or Silquest A171, an organic solvent (MEK, absolute ethanol, etc. . . . ), a surfactant; (compositions B24.1, B24.3 in Table 1 have been tested)

2. A composition C1 containing a water/ethanol based basic solution (all compositions B21C, B22C, B23C in Table 2 have been tested);

3. A composition C2 containing a water/ethanol based solution containing HSbF6 and a surfactant exhibiting pH=1:

Water: 2% Wt, Ethanol: 96% Wt, HSbF6: 1% Wt, Byk 346: 1% Wt, based on the total weight of the composition.

The printed image obtained by ejecting onto a substrate the composition contained in reservoir 1 could be reticulated by ejecting onto said image the composition contained in reservoir 2, promoting the hydrolysis of methoxy groups.

By printing the composition C2 on the hydrolyzed/condensed organosilanes, it was possible to induce a fast cationic reaction of the unreacted epoxy or vinyl moieties. The polymer in these areas became harder and more brittle in respect to the hydrolyzed/condensed organosilanes areas.

Figure 8:
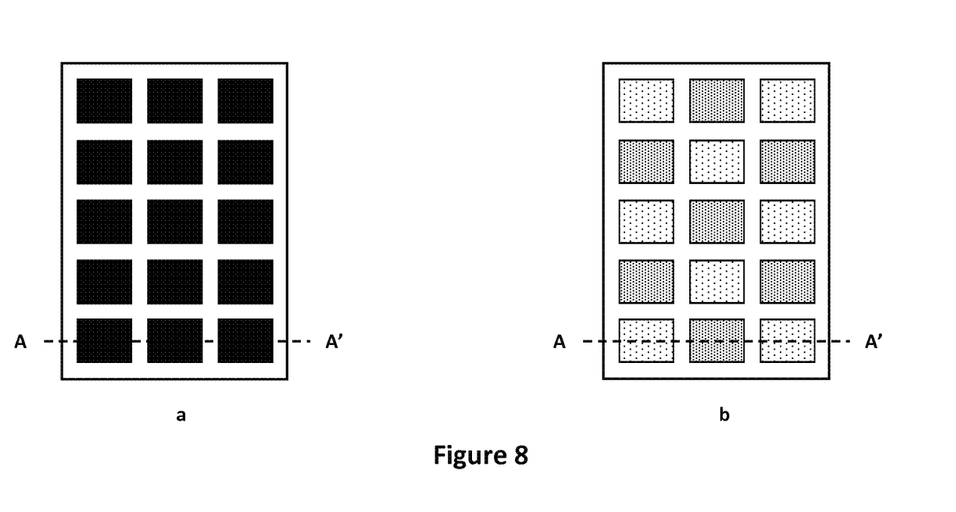
FIG. 8 shows for examples C a) a printed image containing the latent image (hidden) before the external action; b) a latent image made visible after the external action.
Figure 9:
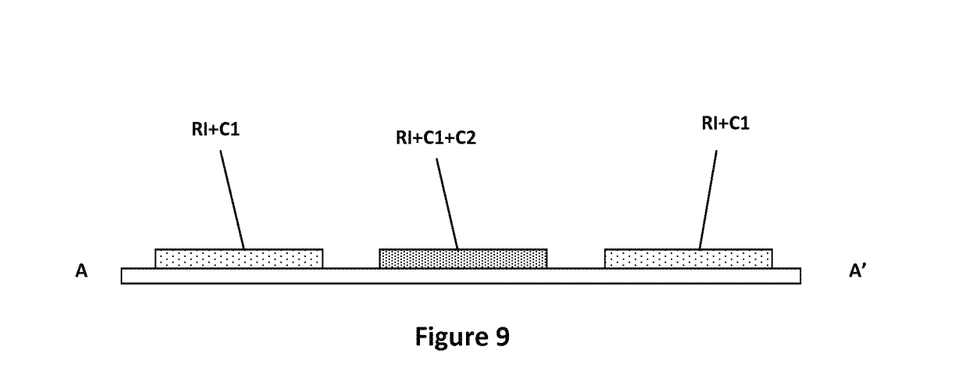
FIG. 9 is a cross section along the line A-A' in FIG. 8 for examples C showing in detail the distribution of the different printed compositions onto the substrate.

After having printed the pattern in FIG. 8 a), a well defined and detectable latent image has been easily and rapidly obtained. (see FIG. 8 b)). In this case, the latent image results from the different hardness of the regions where different compositions have been laid down: measuring on the substrate the hardness in a plurality of points with a durometer, a hardness map can be obtained, turning out in an actual latent image (see FIG. 8 b)). In FIG. 9 a cross section view along the line A-A' in FIG. 8 shows in detail the distribution of the different compositions printed onto the substrate.

The tested substrates dimensions were:
Aluminum: 15 cm×10 cm;
PVC: 30 cm×21 cm;
Steel: 30 cm×21 cm;
Polyethylene: 15 cm×10 cm.

TABLE 1

Tested reactive ink RI stored in reservoir 1

| Components | B21 | B22 | B23 | B24 % Wt | B24.1 | B24.3 |
|---|---|---|---|---|---|---|
| Silquest A1100 | 0 | 0 | 0 | 0 | 0 | 0 |
| Silquest A187 (GPS) | 7.6 | 7.83 | 7.83 | 7.67 | 7.67 | 0 |
| Silquest A171 | 0 | 0 | 0 | 0 | 0 | 7.67 |
| Mercaptopropyl trimethoxy silane | 7.6 | 7.83 | 7.83 | 7.67 | 0 | 0 |
| Byk 346 (surfactant) | 0.85 | 0.88 | 0.88 | 0.86 | 0.86 | 0.86 |
| Black Intraplast RLS (Sensient) C12-14-tert-alkyl, compds. with 1-(2-(5-(1,1-dimethylpropyl)-2-hydroxy-3-nitrophenyl)diazenyl)-2-naphthalenol 1-(2-(2-hydroxy-4(or 5)-nitrophenyl)diazenyl)-2-naphthalenol chromium complexes (dye) | 3 | 0 | 0 | 0 | 0 | 0 |

TABLE 1-continued

Tested reactive ink RI stored in reservoir 1

| Components | B21 | B22 | B23 | B24 % Wt | B24.1 | B24.3 |
|---|---|---|---|---|---|---|
| Valifast Black 3830 (Orient) hydrogen bis[1-[(2-hydroxy-5-nitrophenyl)azo]-2-naphtholato(2-)]chromate(1-) (dye) | 0 | 0 | 0 | 2.06 | 2.06 | 2.06 |
| MEK (Methyl ethyl ketone) | 80.95 | 83.46 | 0 | 0 | 0 | 0 |
| Absolute ethanol | 0 | 0 | 83.46 | 81.74 | 89.41 | 89.41 |

TABLE 2

Tested compositions C1 stored in reservoir 2

| Components | B21C | B22C % Wt | B23C |
|---|---|---|---|
| TMAOH (25% Wt in H2O) | 15 | 0 | 0 |
| H$_2$O | 0 | 30.46 | 30.46 |
| NaOH | 0 | 2.94 | 2.94 |
| Ethanol | 84 | 65.6 | 66.6 |
| Byk346 (surfactant) | 1 | 1 | 0 |
| PH | 14.10 | 12.2 | 12.2 |

TABLE 3

Tested compositions C2 stored in reservoir 3

| Components | B18 | B24.2 % Wt |
|---|---|---|
| Silquest A1100 | 10 | 0 |
| Silquest A187 (GPS) | 0 | 0 |
| Silquest A171 | 0 | 0 |
| Mercaptopropyl trimethoxy silane | 0 | 7.67 |
| Byk 346 (surfactant) | 1 | 0.86 |
| Black Intraplast RLS (Sensient) C12-14-tert-alkyl, compds. with 1-(2-(5-(1,1-dimethylpropyl)-2-hydroxy-3-nitrophenyl)diazenyl)-2-naphthalenol 1-(2-(2-hydroxy-4(or 5)-nitrophenyl)diazenyl)-2-naphthalenol chromium complexes (dye) | 2 | 0 |
| Valifast Black 3830 (Orient) hydrogen bis[1-[(2-hydroxy-5-nitrophenyl)azo]-2-naphtholato(2-)]chromate(1-) (dye) | 0 | 0 |
| MEK (Methyl ethyl ketone) | 87 | 0 |
| Absolute ethanol | 0 | 91.47 |

Examples D

It was also possible to use more than one printhead comprising a single reservoir each. In this case the printing system comprises three or more parallel printheads placed near one another, in order to print the compositions RI, C1, C2 on the same substrate area with good alignment.

Figure 2:
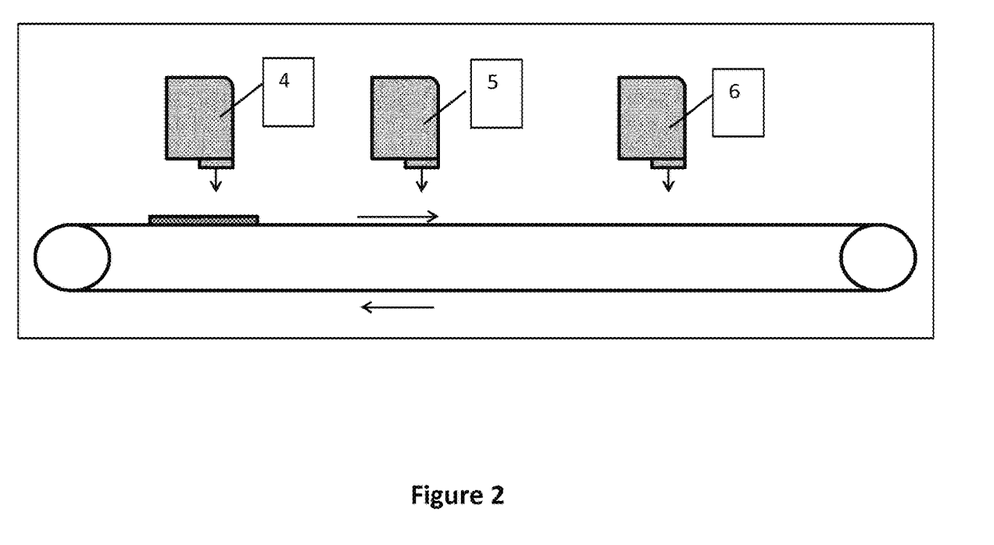
FIG. 2 shows a printing system according to an embodiment of the invention comprising three printheads having one reservoir each, containing a first liquid 4, second liquid 5 and a third liquid 6.

For example, it was possible to print on a heated PVC and aluminum substrate by the printing system represented in FIG. 2.

In this configuration, all reactive inks RI listed in Table 1 have been tested and were ejected onto the PVC substrate heated to temperatures higher than or equal to 45° C.

The preferred compositions for the reactive ink RI are the compositions B21, B22, B23, B24, B24.1. The second aligned printhead ejects any of the composition C1 listed in Table 2 (B21C, B22C, B23C) onto a selected area of the printed image. All compositions B21C, B22C, B23C have been tested in combination with all compositions RI listed in Table 1.

As in the previously described examples, the proportions between the amounts of the compositions deposited by the first and the second printhead are preferably between 5:1 to 2:1.

The third printhead prints with a desired pattern the composition B18 listed in Table 1, which could be reticulated only by heating.

The reaction mechanism is a nucleophilic reaction of amino functionality with respect to the silicon atom of the organosilane, promoting the exiting of ethanol molecule.

The B18 formulation filled in reservoir 3 could be used as a C2 catalyst composition, in order to promote the nucleophilic reaction of amino functionality with respect to the epoxy moieties of the organosilane named GPS contained into the RI compositions (B21, B22, B23, B24, B24.1)

The new polymer obtained by reticulation of the aminosilane exhibits an intrinsic polarity and basicity which is exploited to reveal its presence in the printed image.

Figure 10:
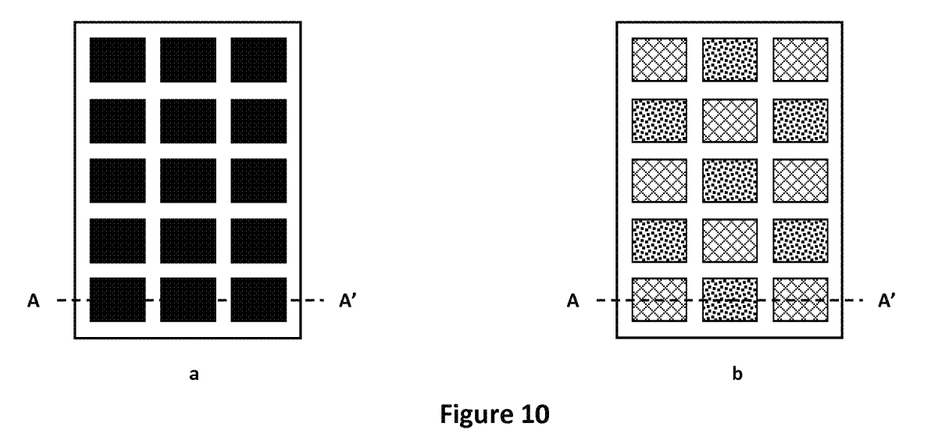
FIG. 10 shows for examples D a) a printed image containing the latent image (hidden) before the external action; b) a latent image made visible after the external action.
Figure 11:
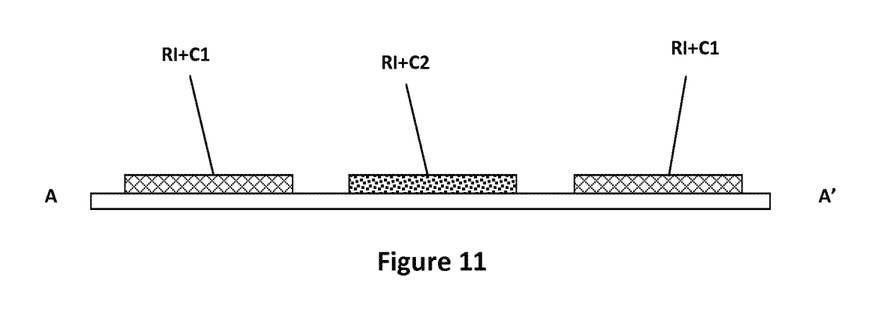
FIG. 11 is a cross section view along the line A-A' in FIG. 10 for examples D showing in detail the distribution of the different printed compositions onto the substrate.

After having printed the pattern in FIG. 10 *a*), a well defined and detectable latent image has been easily and rapidly obtained (see FIG. 10 *b*)). In this case, the latent image can be produced by the condensation of the aqueous vapor, due to the different wettability in the pattern selected areas. Breathing onto the printed substrate will cause an optical contrast between the different regions, because the vapor condensation is stronger on the polymer surface having a higher polarity, causing an opacity effect. In FIG. 11 a cross section view along the line A-A' shows in detail the distribution of the different compositions onto the substrate, according to the two described experiments.

The tested substrates dimensions were:
Aluminum: 15 cm×10 cm;
PVC: 30 cm×21 cm.

Examples E

Figure 3:
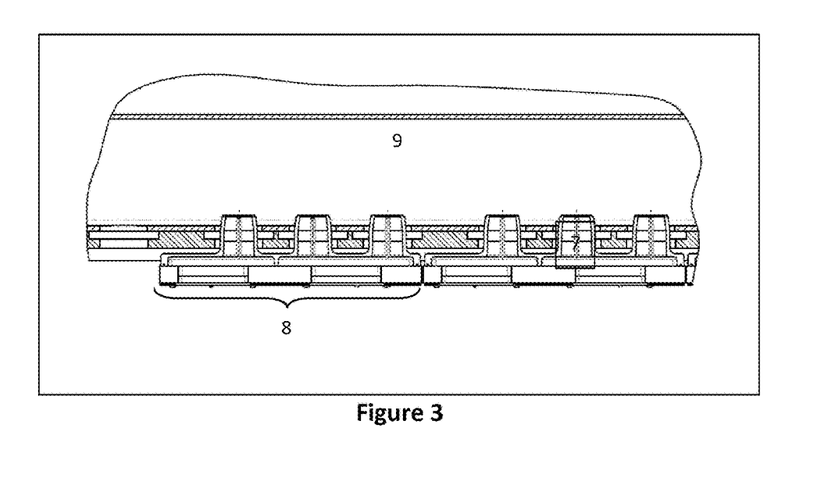
FIG. 3 shows a printing system with a print bar connected to three reservoirs containing different compositions according to a further embodiment of the invention.

An alternative printing system is a print bar system connected to separate reservoirs containing the different compositions RI, C1, C2 (FIG. 3). Such a print bar is particularly advantageous when printing on large-size substrates is necessary. In order to implement the invented solution, it is necessary to have at least three print bars, fed with the different compositions.

Each printing module is independent and prints a composition onto a heated substrate. The substrate was paper and PVC, and was heated to a temperature near to 50° C. The channels guide the composition to each printing modules 8. The large channel 9 feeds all channels.

Each parallel print bar system, similarly to the system with separate printheads described before, can eject different compositions such as those listed in Table 1 or 2. In order to obtain the reaction between the different compositions printed onto the substrate by means of different print bars it's beneficial to realize an overlap of the ejected reactive compositions.

A print bar can eject onto the substrate the composition RI. In order to realize the reaction of said composition, obtaining a solid polymeric film, it's necessary to print onto the first printed image by means of a parallel print-bar connected to another reservoir, any of the compositions listed in Table 2.

The compositions contained in Table 2 promote the reaction of the compositions RI, obtaining a solid film having good adhesion and good mechanical properties.

The printbar of FIG. 3 has been actually used to print B24.1 (RI), any of the compositions listed in Table 2 (C1), and B24.2 (C2).

The solid film obtained by the hydrolysis and condensation of trimethoxy functionalities of the evaluated organosilanes, by mixing B24.1 with one of the compositions listed in Table 2, by using proportions of catalyst in respect to epoxy silane between 5:1 to 2:1, contains unreacted epoxy functionalities of (3-glycidiloxypropyl)trimethoxysilane. The film is dry after the heating step.

Said film exhibits good adhesion and flexibility and the typical softness of siloxane based polymeric materials. The flexibility has been characterized by means of a Perkin Elmer DSC7 equipment by using a ramp between room temperature to 200° C. (rate 10° C./min) and measuring the glass transition.

The glass transition of a polymer material is related to its flexibility; composition B24.1 reacted with any generic alkaline solution listed in Table 2 in proportions between 5:1 to 2:1, generates a polymer having a Tg of 65° C. As a consequence, the film is quite flexible.

The polysiloxane film exhibits a contact angle with water equals to 65° or lower. This value derives from a certain polarity of the polymer.

As a function of the ratio of the two ejected compositions, unreacted silanol groups remain in the film and consequently a higher or lower resistance to polar solvents like water can be provided to the polymer. The polarity of the film is demonstrated by the low resistance to water flux: by washing the film for 30 seconds with cold water the film is dramatically damaged or removed.

By printing onto the produced image with the third composition B24.2 comprising the mercaptosilane a further effect can be obtained. This molecule is able to react with the epoxysilane opening the oxirane ring by anionic mechanism, especially in basic environment. This reaction promotes the polymerization of the epoxy groups and consequently strongly increases the hardness and abrasion resistance of the polymer.

The polysiloxane film after reaction with composition B24.2 increases dramatically its hardness and mechanical resistance; as a function of the quantity of used mercaptosilane, the glass transition of the polymeric film increases drastically.

The final Tg, after a curing of 30 seconds to 50° C., has been measured by means of a Perkin Elmer DSC7 equipment (between room temperature and 200° C., rate 10° C./min): the value is not detectable anymore. This demonstrates that the film became brittle in respect to the original polysiloxane one.

The Tg of said final polymeric film increases dramatically in respect to the value obtained without using the mercaptosilane composition B24.2.

As a consequence of the interaction with mercaptosilane, the film polarity becomes lower as well, and the contact angle with water becomes higher than 70°.

The relationship between the latent image and the different compositions is similar to the Example A and can be adequately described by the same figures.

After having printed the pattern in FIG. 5 a), a well defined and detectable latent image has been easily and rapidly obtained by printing the C2 compositions (see FIG. 5 b)). In FIG. 6 a cross section view along the line A-A' in FIG. 5 shows in detail the distribution of the different compositions onto the substrate.

The tested substrates dimensions were:
Paper: 30 cm×21 cm;
PVC: 30 cm×21 cm.

Experimental Methods Used for Revealing of the Latent Image

The latent image was detected by executing one of the following external actions, depending on the physical/chemical and mechanical properties of the produced polymers.

If the polymer constituting the latent image exhibits elastomeric properties or if its cohesion is not particularly high it was possible to detect its presence by means of a number of mechanical external actions. Said actions are listed below:

Rubbing test: execute an abrasion of the printed image by means of a rubber till the latent image appears.

Tape test: apply a tape onto the printed image and remove it quickly, in order to damage or detach the latent image;

Indentation or bending: the printed image could be indented by means of a hard material or bended. The flexible latent image exhibits different marks as a consequence of the external action, with respect to the other adjacent selected areas of the printing.

It was also possible to detect the presence of a latent image using its chemical properties, such as solvent resistance and wettability. The external actions useful to reveal the different chemical properties of the polymers in the printed areas are the following:

Washing with water or organic solvent: the printed image is washed for the time needed to make visible the latent image. The used solvent must be able to swell or solubilize a selected area of the printed image.

Wettability test: This detection can be simply executed by producing an aerosol of water drops on the printed surface. The more polar areas will be wetted by water drops more easily with respect to the less polar ones; consequently it will be possible to identify a corresponding latent image.

It was also possible to detect the presence of a latent image using its physical properties. One external action that can be successfully used, in order to reveal physical transitions of the latent image is described below:

Infrared thermal image detection: the printed image is heated from room temperature to a temperature above the melting point of a crystalline polymer composing the latent image. In correspondence to the melting point, a phase transition occurs involving a local heat absorption that can be revealed by means of an infrared thermocamera. In the opposite way, but according to the same principle, it is possible to detect by means of the same instrument a heat release whenever said melted latent image is cooled down under its melting point.

FTIR analysis on the considered organosilanes systems have been performed, in order to study and verify the hydrolysis/condensation rate of the methoxy or ethoxy groups as a function of contact with water under different conditions and proportions.

Figure 4:
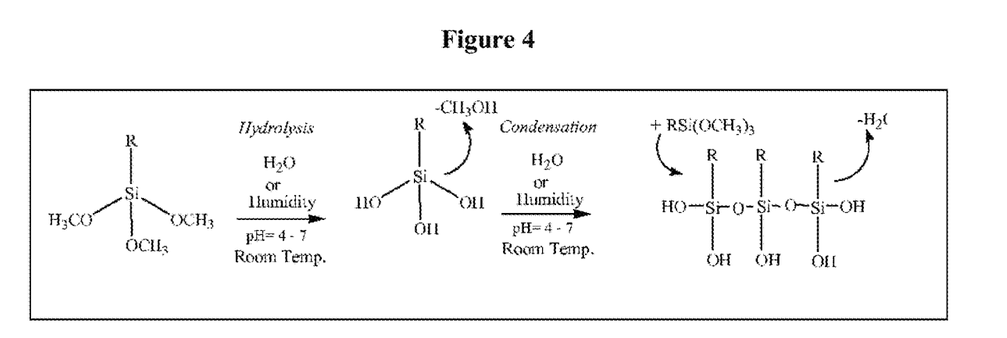
FIG. 4 shows hydrolysis of trimethoxy groups and condensation of silanol groups.

The corresponding realized hydrolysis of trimethoxy groups and condensation of silanol groups is represented in FIG. 4.

By observing the characteristic frequency of O—H vibration between 3400 and 3600 cm-1 it is possible to measure an increase of the peak of organosilane as a consequence of contact with water.

Particularly, it has been observed that the higher is the pH of composition C1 in reservoir 2, the higher is the condensation rate of hydrolyzed moieties.

The lower is pH, the lower is the condensation rate and consequently the higher is the infrared O—H peak (the hydrolyzed functionalities don't polymerize).

In general, it is also observable by means of the FTIR technique that the best proportion to have high reaction rate of the silane is a proportion of organosilane/water equal or lower than 4:1.

The invention claimed is:

1. A printing system for printing a security feature comprising at least three compositions,
   wherein one composition is a reactive ink comprising a silane compound comprising at least a first and a second polymerizable moiety which are different from each other and are polymerizable by different mechanisms, loaded in a first reservoir of a first printhead,
   wherein another composition is a first catalyst composition comprising a substance able to react with the silane compound of the reactive ink and promote the polymerization of the first polymerizable moiety, loaded in a second reservoir of said first printhead or of a second printhead, and
   wherein another composition is a second catalyst composition comprising a substance able to react, alone or in presence of the first catalyst composition, with the silane compound of the reactive ink and promote the polymerization of the second polymerizable moiety, loaded in a third reservoir of said first printhead, or of said second printhead, or of a third printhead.

2. The printing system of claim 1, wherein the reactive ink and/or the first catalyst composition and/or the second catalyst composition comprise a dye and/or a pigment.

3. The printing system of claim 1, wherein one of the first and the second polymerizable moiety in the silane compound is an epoxide group, an alkoxysilane group, a (meth)acrylic group, a vinyl group and an amino group.

4. The printing system of claim 1, wherein the first polymerizable moiety is a group capable of forming a polysiloxane, and wherein the second polymerizable moiety is selected from polymerizable moieties capable of forming a polymer other than a polysiloxane.

5. The printing system of any of claim 1, wherein the different polymerization mechanisms are different mechanisms selected from cationic, anionic, radical, and condensation polymerization.

6. The printing system of any of claim 1, wherein the silane compound is a compound of formula i or ii:

$R^1_3Si\text{-}L\text{-}S_4\text{-}L\text{-}SiR^1_3$ wherein L is $C_{1-6}$-alkylene, and $R^1$ each independently is $C_{1-6}$-alkoxy or halogen; or $R_nSi(R^1)_m$ wherein $R^1$ each independently is $C_{1-6}$-alkoxy or halogen, n=1 or 2, (n+m)=4, and R each independently is vinyl, phenyl, or $C_{1-6}$-alkyl optionally substituted with one or more group(s) selected from epoxy, epoxy-$(C_{1-6})$-alkyloxy, $C_{5-7}$-cycloalkyl having an epoxide functionality, cyano, halogen, amino, $C_{1-6}$-alkylamino, di($C_{1-6}$-alkyl)amino, amino-$C_{1-6}$-alkylamino, acryloyloxy, methacryloyloxy, and vinyl; with at least one R being vinyl, phenyl, or substituted $C_{1-6}$-alkyl.

7. The printing system of claim 5, wherein the silane compound is a compound of formula ii, and wherein in formula ii $R^1$ is $C_{1-6}$-alkoxy and n=1.

8. The printing system of claim 7, wherein all groups $R^1$ are the same and are selected from methoxy, ethoxy and propoxy.

9. The printing system of claim 8, wherein the silane compound is selected from (3-glycidyloxypropyl)trimethoxysilane (GPS), aminopropyltriethoxysilane (APTES), N-(β-aminoethyl)-γ-aminopropyltrimethoxysilane, 3-methacryloxypropyltrimethoxysilane, vinyltrimethoxysilane, trimethoxy [2-(7-oxabicyclo[4.1.0]hept-3-yl)ethyl]silane, and bis [3-(triethoxysilyl)propyl]tetrasulfide.

10. The printing system of claim 1, wherein the reactive ink and/or the second catalyst composition further comprises (mercaptopropyl)trimethoxysilane (3-MPTS).

11. The printing system of claim 1, wherein the first catalyst composition is a solution having a pH of ≥8, preferably ≥8, more preferably ≥9.

12. The printing system of claim 11, wherein the first catalyst composition is a solution of an amine or of a hydroxide, a carbonate or a hydrogen carbonate of ammonium, tetramethylammonium or an alkaline or alkaline earth metal.

13. The printing system of claim 1, wherein the second catalyst composition is a solution having a pH of ≤7.

14. The printing system of claim 13, wherein the second catalyst composition comprises an acid selected from hexafluoroantimonic acid ($HSbF_6$), sulfuric acid ($H_2SO_4$), hydrochloric acid (HCl), triflic acid ($CF_3SO_3H$), and hexafluorophosphoric acid ($HPF_6$).

15. The printing system of claim 10, wherein the first catalyst composition and/or the second catalyst composition comprise a mixture of water and ethanol as a solvent.

16. The printing system of any of claim 1, wherein one or more of the reactive ink, the first catalyst composition and the second catalyst composition further comprises a surfactant.

17. The printing system of claim 2, wherein the reactive ink comprises the dye and the dye is selected from Solvent Black 27 and/or Solvent Black 29.

18. A method for preparing a printed object in the form of a security feature, using the printing system of claim 1, comprising the steps of
   (1) printing on a substrate using the reactive ink to form an image,
   (2) reticulating a first selected area of the image by ejecting the first catalyst composition onto said first selected area, and
   (3) reticulating a second selected area of the image by ejecting the second catalyst composition onto said second selected area.

19. The method according to claim 18, wherein said first selected area and said second selected area are
   a. different and non-overlapping areas of the image;
   b. partially overlapping areas of the image;
   c. arranged such that said first selected area is fully encompassed by said second selected area, or vice versa; or
   d. identical areas of said image.

20. The method according to claim 19, wherein the printed object is a security feature containing one or more latent images.

21. A printed object obtained by the method of claim 18.

* * * * *